United States Patent
Cave

(12) United States Patent (10) Patent No.: US 7,471,422 B2
Cave (45) Date of Patent: Dec. 30, 2008

(54) COMPUTER PROGRAM AND METHOD FOR GENERATING A MULTIPLE-BIT IMAGE DATA FILE FROM A 1-BIT IMAGE DATA FILE

(76) Inventor: Andrew William Peter Cave, Whitehall House, Longstanton Road, Oakington, Cambridge (GB) CB4 5BB (*) Notice: Subject to any disclaimer, the term of this patent is extended or adjusted under 35 U.S.C. 154(b) by 594 days.

(21) Appl. No.: 11/296,760

(22) Filed: Dec. 7, 2005

(65) Prior Publication Data

US 2007/0127076 A1 Jun. 7, 2007

(51) Int. Cl.
*G06K 15/00* (2006.01)
*H04N 1/405* (2006.01)

(52) U.S. Cl. .................. 358/3.11; 358/3.12

(58) Field of Classification Search ........... 358/1.1, 358/1.9, 3.11, 3.12, 3.2
See application file for complete search history.

(56) References Cited

U.S. PATENT DOCUMENTS 5,553,204 A * 9/1996 Hiroyuki ............ 358/1.16
6,850,216 B2 * 2/2005 Akimoto et al. ............ 345/90
7,050,645 B2 * 5/2006 Sato et al. .................. 382/250

OTHER PUBLICATIONS

Cave, Dot Gain Tool Invention White Paper (v1.1), Hamillroad Software, pp. 1-13, Jan. 2005.

* cited by examiner

*Primary Examiner*—Douglas Q Tran
(74) *Attorney, Agent, or Firm*—Barnes & Thornburg LLP

(57) ABSTRACT

A computer program and method for generating from a 1-bit image data file a multiple-bit image data file, which, when displayed on a computer display screen, resembles an image that would appear on an output medium as a result of an output device printing the 1-bit file, the program being operable to carry out, and the method comprising, the steps of: receiving a 1-bit image data file and first and second values that characterize actual regions of the output medium that would be marked by the output device when printing single and consecutive "on" pixels of the 1-bit file; calculating from the "on" pixels and the first and second values, proportions of corresponding notional rectangular regions of the output medium that would be marked by the output device when printing the "on" pixels; and setting values of the pixels of a multiple-bit image data file according to the calculated proportions.

18 Claims, 9 Drawing Sheets

COMPUTER PROGRAM AND METHOD FOR GENERATING A MULTIPLE-BIT IMAGE DATA FILE FROM A 1-BIT IMAGE DATA FILE

FIELD OF THE INVENTION

This invention relates to a computer program and a method for generating a multiple-bit image data file from a 1-bit image data file, and more particularly to a computer program and a method for generating a multiple-bit image data file, which, when displayed on a display screen of a computer system, resembles an image that would appear on an output medium as a result of printing of a 1-bit image data file by an output device.

BACKGROUND TO THE INVENTION

Computer systems operable to convert a multiple-bit image data file to a 1-bit image data file comprising an array of "on" and "off" pixel values for printing on an output medium by an output device are well known. The inventor's white paper "Dot Gain Tool White Paper (v1.1)" discusses such computer systems and output devices in detail and is incorporated herein by reference.

The output medium is divided into an array of notional rectangular, typically square, regions, each region of the medium corresponding to a pixel value of the 1-bit file. In order to print the 1-bit file, the output device attempts to mark each of the notional rectangular regions of the output medium that corresponds to an "on" pixel value of the 1-bit file.

Various factors result in the actual region of the output medium that is marked by the output device when attempting to print an "on" pixel of the 1-bit file differing from the notional rectangular region.

One such factor is that the actual region marked by the output device is typically circular or elliptical, because the output device uses a laser beam (which is circular) to mark the output medium in the case of an output device such as an imagesetter or computer-to-plate system, or squirts droplets of a marking liquid through a slit in the case of an inkjet printer.

Although the diameter of the laser beam of the output device can be adjusted, so as to adjust the diameter of the circular region marked on the output medium when printing an "on" pixel of the 1-bit file, either the circular region will not entirely mark the notional rectangular region, or, if it does entirely mark the notional rectangular region, it will extend into the notional rectangular regions surrounding that region. These situations are shown in FIG. 7 of the drawings.

Where the circular region marked on the output medium does not entirely mark the notional rectangular region, the result is so-called "dot loss" where portions of the image resulting from printing the 1-bit file that are intended to have an image density of, say, 60%, in fact have an image density of, say, 50%.

Where the circular region marked on the output medium is larger than the notional rectangular region, or marks the surrounding notional rectangular regions, the result is so-called "dot gain", where portions of the image resulting from printing the 1-bit file that are intended to have an image density of, say, 60% in fact have an image of, say, 70%.

Dot loss and dot gain can also result from the way in which output devices that use a laser to mark the output medium operate. Such devices direct a laser device back and forth across the output medium in a so-called "fast scan" direction as the output medium is advanced through the output device or an imaging head is moved across the medium in a so-called "slow scan" direction, turning on the laser device whenever it is necessary to mark one of the notional rectangular regions of the output medium.

The time taken to turn on and turn off the laser device, along with the exposure setting (power level of the laser beam), means that, unless the power output of the laser device is relatively high, the laser device may not be on for a sufficient time to mark the notional rectangular region unless it is one of several consecutive regions to be marked. such that the laser device is already on when it is directed at the region. The turn on and turn off times of the laser device, coupled with the exposure setting, cause dot loss.

It will be appreciated, however, that if the laser device marks several consecutive notional square regions, the resulting region of the output medium that will be marked by the laser device will consist of a rectangular region with a generally semicircular region at either end, resulting from the laser beam being scanned across the consecutive notional square regions. The shape of the regions so marked is shown in FIG. 14. The rectangular region marked on the output medium instead of a series of circular regions causes dot gain.

This has been dealt with by calibrating the computer system by printing a 1-bit file on the output device with a plurality of patches of different image densities from 0% to 100%, measuring the actual densities of the patches printed on the output medium and producing a calibration curve of requested image density against actual image density. The calibration curve is then used by the computer system to adjust the 1-bit file that it generates from the multiple-bit file so that the actual image densities of the image printed on the output medium match the requested image densities.

Although this works well, if the 1-bit file is converted to a multiple-bit file for display by a display device of the computer system, the image displayed on the display device may bear little resemblance to the image that would be printed by the output device. Where the dot gain of the output device is relatively large, as in the case of an inkjet printer that squirts droplets of a marking liquid at the output medium, the image displayed on the display device may be so reduced in image density as to be undiscernible.

SUMMARY OF THE INVENTION

According to a first aspect of the invention there is provided a computer program for executing on a computer system a computer process for generating a multiple-bit image data file from a 1-bit image data file, which multiple-bit file, when displayed on a display screen of the computer system, resembles an image that would appear on an output medium as a result of printing of the 1-bit file by an output device, the computer process comprising:

receiving a 1-bit image data file comprising an array of "on" and "off" pixels, each pixel corresponding to a notional rectangular region of an output medium, which notional rectangular region an output device would attempt to mark when printing the 1-bit file if the pixel were an "on" pixel;

receiving at least one first value that characterises a size and a shape of an actual region of the output medium that would be marked by the output device when printing a single "on" pixel of the 1-bit file;

receiving at least one second value that characterises a size and a shape of an actual region of the output medium that would be marked by the output device when printing two or more consecutive "on" pixels of the 1-bit file; and for each pixel in turn of the 1-bit file:

determining which of that pixel and the pixels neighbouring that pixel are "on" pixels;

calculating from the pixels determined to be "on" pixels and the first and second values, a proportion of the notional rectangular region of the output medium to which that pixel corresponds that would be marked by the output device when printing the pixels determined to be "on" pixels; and setting a value of a pixel of a multiple-bit image data file corresponding to that pixel according to the calculated proportion of the notional rectangular region of the output medium.

For the purposes of this specification, an "output medium" is a medium that can be marked so as to cause an image to appear on the medium and an "output device" is a device operable to mark an output medium. Examples of output media include paper, printing plates for use in printing presses and photosensitive film for use in making printing plates. Examples of output devices include inkjet printers, computer-to-film imagesetters, computer-to-plate systems and printing presses.

Receiving the at least one first value may advantageously comprise receiving a major and a minor diameter of an elliptical actual region of the output medium that would be marked by the output device when printing a single "on" pixel of the 1-bit file.

Certain inkjet printers squirting droplets of a marking liquid would mark an elliptical actual region of the output medium.

Receiving the at least one first value preferably comprises receiving a radius of a circular actual region of the output medium that would be marked by the output device when printing a single "on" pixel of the 1-bit file.

Most imagesetters and computer-to-plate systems would mark a circular actual region of the output medium.

Receiving the at least one first value may advantageously comprise receiving a radius from one half to one times a width of the notional rectangular region of the output medium that would be marked by the output device.

Receiving the at least one first value preferably comprises receiving a radius from one half to one and a half times a width of the notional rectangular region of the output medium that would be marked by the output device.

Receiving the at least one second value may advantageously comprise receiving an indication of whether the output device would mark the actual region of the output medium continuously or discretely when printing two consecutive "on" pixels.

An inkjet printer would mark the actual region of the output medium discretely by squirting a first droplet of the marking liquid at a first region of the output medium, moving a print head relative to the medium and squirting a second droplet at a second region of the output medium.

An imagesetter, on the other hand, would mark the actual region of the output medium continuously by directing a laser beam at a first region of the output medium and moving the laser beam from the first region to a second region of the output medium, thereby marking any region of the output medium between the first and second regions.

Receiving the at least one second value preferably comprises receiving that proportion of the actual region of the output medium that would be marked by the output device when printing an "on" pixel having just printed an "on" pixel, which would be marked by the output device when printing an "on" pixel having just printed an "off" pixel.

In the case of an inkjet printer, the actual region of the output medium that is marked when printing an "on" pixel is unaffected by whether the printer has just printed an "on" pixel or an "off" pixel.

In the case of an imagesetter, on the other hand, because of the time taken to turn on the laser beam, the actual region of the output medium that is marked when printing an "on" pixel having just printed an "off" pixel is smaller than the actual region that is marked when printing an "on" pixel having just printed an "on" pixel. This is because the laser beam is not turned off between printing the first and second "on" pixels, but merely swept from the first to the second "on" pixel.

In the preferred embodiment of the invention receiving the at least one second value comprises receiving that proportion from zero to one of the actual region that would be marked by the output device when printing an "on" pixel after an "on" pixel, which would be marked by the output device when printing an "on" pixel after an "off" pixel.

Determining which of that pixel and the pixels neighbouring that pixel are "on" pixels preferably comprises determining which of that pixel and the pixels adjoining that pixel are "on" pixels.

Calculating from the pixels determined to be "on" pixels and the first and second values the proportion of the notional rectangular region that would be marked by the output device when printing the pixels determined to be "on" pixels preferably comprises:

if that pixel is an "on" pixel, calculating from the at least one first value a first proportion of the notional rectangular region that would be marked by the output device when printing that pixel; and if the pixel to the left of that pixel and/or the pixel to the right of that pixel is an "off" pixel, calculating from the at least one second value a first scaling factor to be applied to the first proportion and applying the first scaling factor to the first proportion; and for each of the pixels adjoining that pixel that is an "on" pixel, calculating from the at least one first value a further proportion of the notional rectangular region that would be marked by the output device when attempting to print the pixel; and if the pixel to the left of the pixel neighbouring that pixel and/or the pixel to the right of the pixel neighbouring that pixel is an "off" pixel, calculating from the at least one second value a further scaling factor to be applied to the further proportion and applying the scaling factor to the further proportion; and summing the first and further scaled proportions.

Preferably the computer process further comprises:

calculating from the at least one first and second values a proportion of a notional rectangular region that would be marked by the output device when printing each possible combination of "on" and "off" pixels of that pixel and the pixels that adjoin that pixel; and constructing a lookup table containing the proportions of the notional rectangular region that would be marked and the possible combinations of "on" and "off" pixels of that pixel and the pixels adjoining that pixel.

In the preferred embodiment calculating from the pixels determined to be "on" pixels and the first and second values the proportions of the notional rectangular region that would be marked by the output device when printing the pixels determined to be "on" pixels comprises identifying the combination of "on" and "off" pixels of that pixel and the pixels adjoining that pixel and reading from the lookup table the proportion of the notional rectangular region corresponding to that combination.

Setting the value of the pixel of the multiple-bit image data file corresponding to that pixel according to the calculated proportion of the notional rectangular region preferably comprises setting the value of a pixel of an 8-bit image data file corresponding to that pixel to a value equal to the nearest integer to 255 multiplied by the calculated proportion.

In this way, when the resulting 8-bit image data file is displayed on the display screen of the computer system, a notional rectangular region of the output medium which ought not to be marked, because it corresponds to an "off" pixel, but which is in fact marked on 25% of its area as a result of the output device printing the "on" pixels that neighbour the "off" pixel, would be represented by a pixel with a colour 25% between a paper colour and an ink colour of the display screen, so that the image on the display screen resembles the image printed on the output medium.

According to a second aspect of the invention there is provided a method for generating a multiple-bit image data file from a 1-bit image data file, which multiple-bit file, when displayed on a display screen of a computer system, resembles an image that would appear on an output medium as a result of printing of the 1-bit file by an output device, the method comprising:

loading a 1-bit image data file into a computer system, the 1-bit image data file comprising an array of "on" and "off" pixels, each pixel corresponding to a notional rectangular region of an output medium, which notional rectangular region an output device would attempt to mark when printing the 1-bit file if the pixel were an "on" pixel;

entering at least one first value that characterises a size and a shape of an actual region of the output medium that would be marked by the output device when printing a single "on" pixel of the 1-bit file;

entering at least one second value that characterises a size and a shape of an actual region of the output medium that would be marked by the output device when printing two or more consecutive "on" pixels of the 1-bit file; and for each pixel in turn of the 1-bit file, using the computer system to:

determine which of that pixel and the pixels surrounding that pixel are "on" pixels;

calculate from the pixels determined to be "on" pixels and the first and second values, a proportion of the notional rectangular region of the output medium to which that pixel corresponds that would be marked by the output device when printing the pixels determined to be "on" pixels;

set a value of a pixel of a multiple-bit image data file corresponding to that pixel according to the calculated proportion of the notional rectangular region of the output medium; and display the multiple-bit image data file on a display screen.

The method may advantageously further comprise:

receiving a 1-bit image data file of a calibrated calibration strip, the calibrated calibration strip including a portion, which, if the 1-bit file were printed on the output medium by the output device would have a predetermined image density;

using the computer system to calculate an image density of the portion of the calibrated calibration strip displayed on the display screen;

entering a modified first value according to the image density calculated by the computer system; and repeating the method until the image density calculated by the computer system is equal to the predetermined image density.

The method may advantageously still further comprise:

receiving a 1-bit image data file of a calibrated calibration strip, the calibrated calibration strip including a portion, which, if the 1-bit file were printed on the output medium by the output device, would demonstrate that proportion of the actual region of the output medium that would be marked by the output device when printing an "on" pixel having just printed an "on" pixel, which would be marked by the output device when printing an "on" pixel having just printed an "off" pixel;

causing the output device to print the 1-bit file on the output medium;

entering a modified second value according to a difference between an image that appears on the output medium and the multiple-bit image displayed on the display screen; and repeating the method until the multiple-bit image displayed on the display screen resembles the image that appears on the output medium.

Preferably the portion of the calibrated calibration strip includes a plurality of concentric circles with a line thickness of one pixel, and entering the modified second value according to the difference between the image that appears on the output medium and the multiple-bit image displayed on the display screen and repeating the method until the multiple-bit image displayed on the display screen resembles the image that appears on the output medium comprises measuring from the image that appears on the output medium a point at which the concentric circles become invisible and entering a modified second value until the concentric circles of the multiple-bit image displayed on the display screen become invisible at the same point as in the image that appears on the output medium.

The method may advantageously further comprise entering a modified first value after entering a modified second value, so as to maintain the image density calculated by the computer system equal to the predetermined image density.

BRIEF DESCRIPTION OF THE DRAWING FIGURES

The invention will now be described by way of illustrative example and with reference to the accompanying drawings, in which.

DETAILED DESCRIPTION OF AN EMBODIMENT

Figure 1:
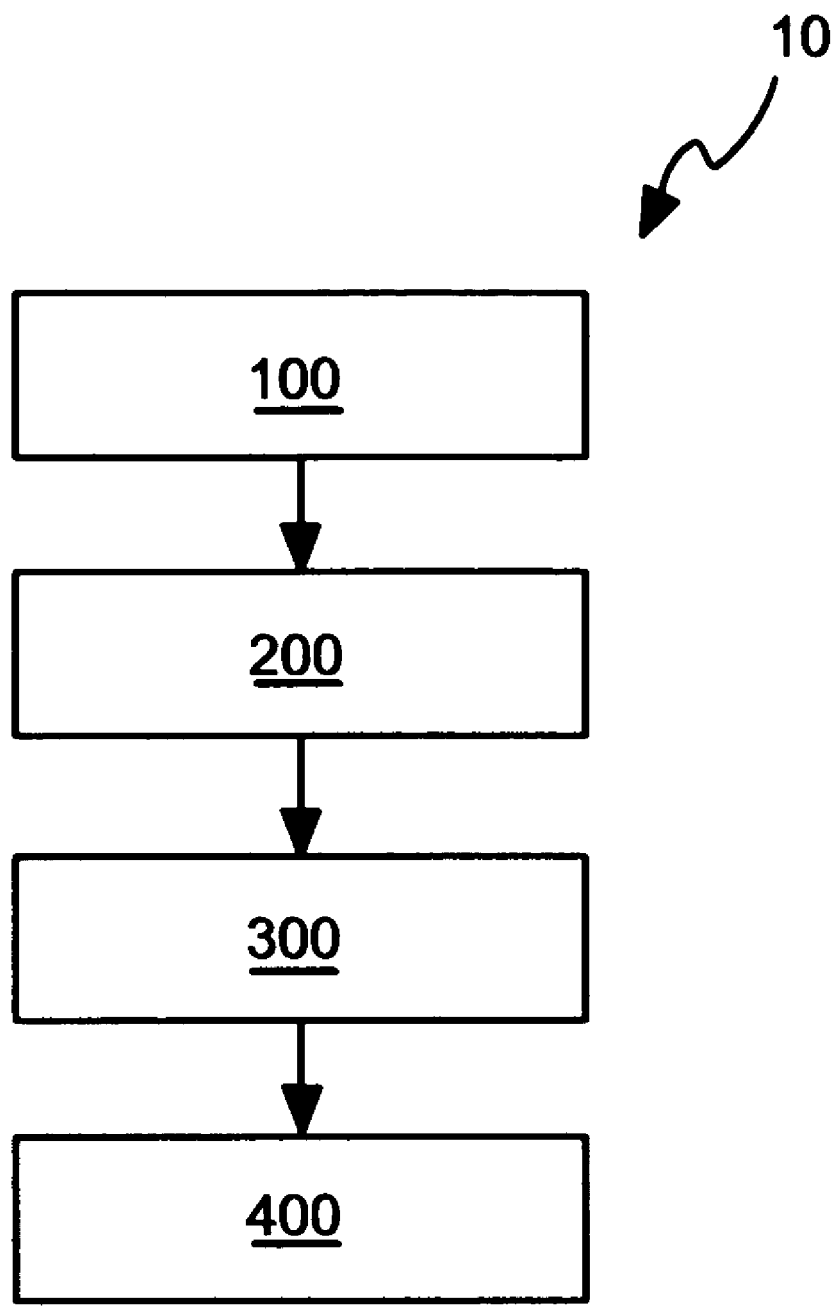
FIGS. 1 to 5 are flow diagrams of a computer process executed by a computer program in accordance with the first aspect of the invention.

FIG. 1 shows a computer process 10 that is executed by a computer program in accordance with the first aspect of the invention. The computer process comprises first, second, third, fourth and fifth operations 100, 200, 300, 400 and 500 respectively.

Figure 2:
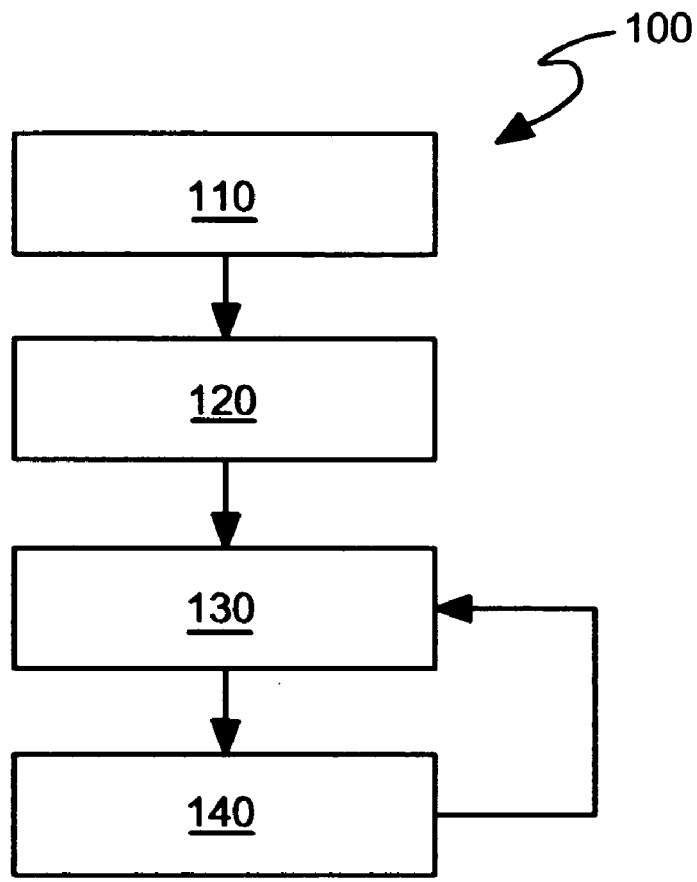
Figure 3:
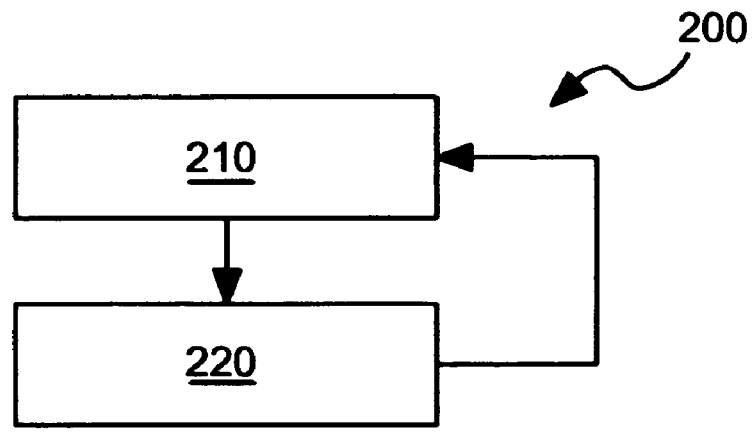
Figure 4:
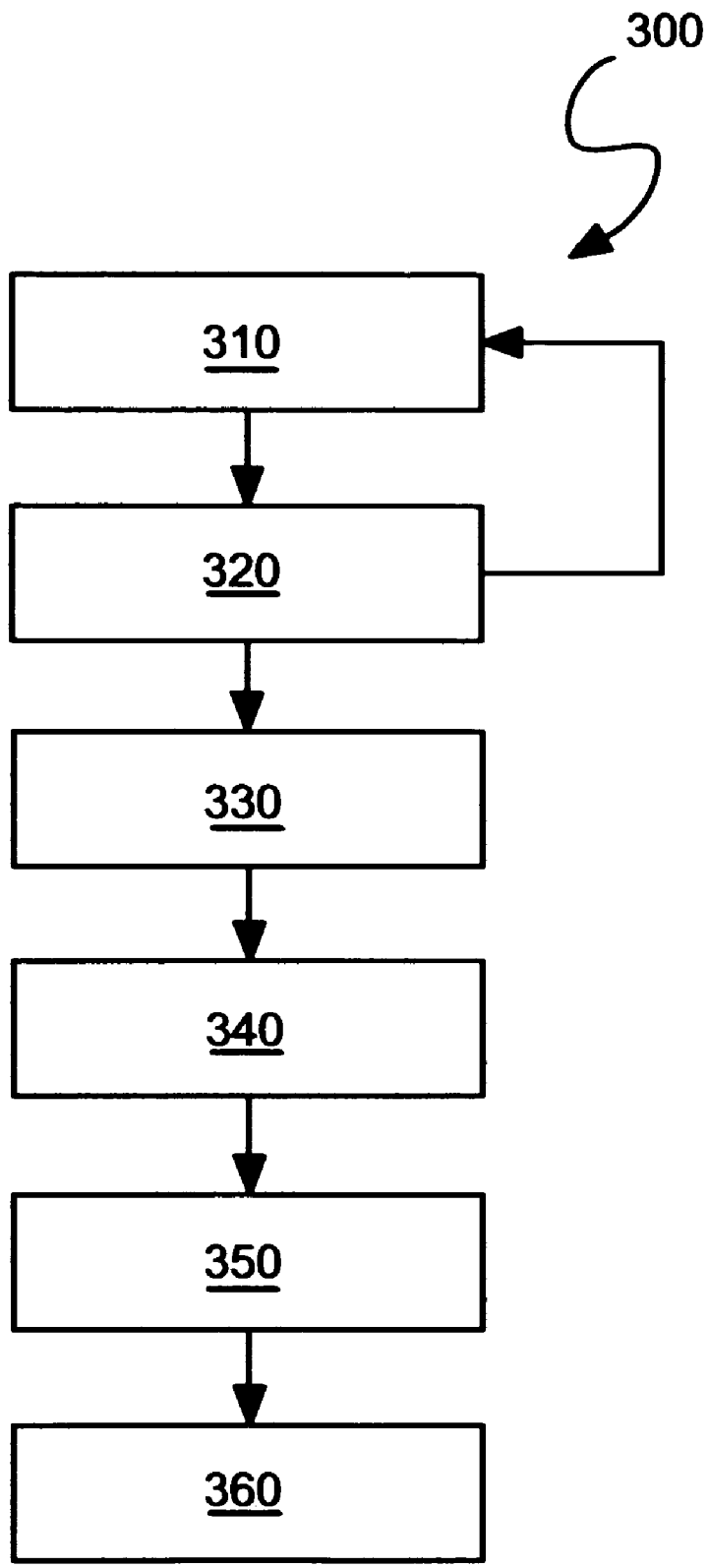
Figure 5:
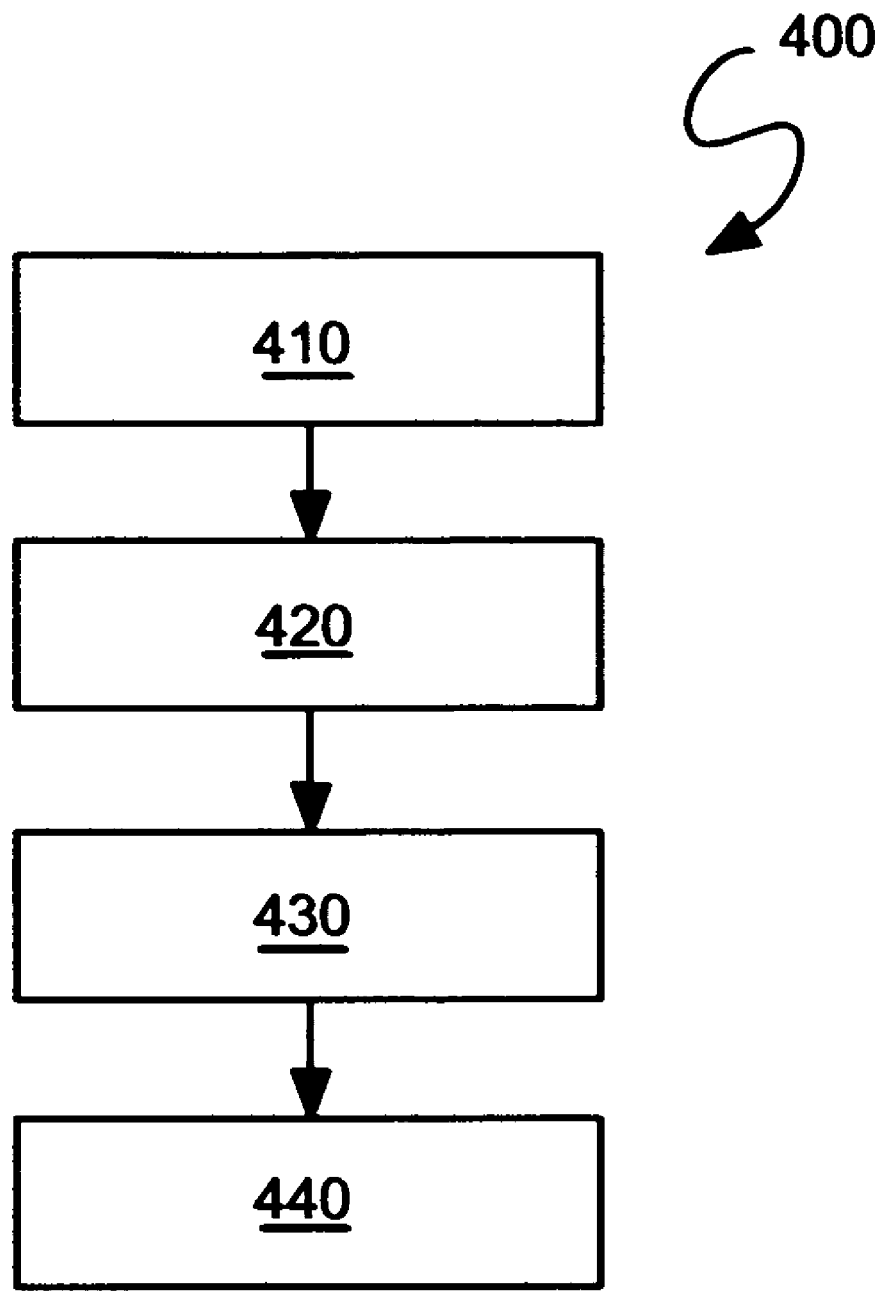

The first operation is shown in FIG. 2 and comprises the steps of receiving 110 a 1-bit image data file in the form of a Harlequin PGB (page buffer) or TIFF (tagged image file format) file, creating 120 a window to display a portion of the 1-bit file on a display screen, reading 130 the pixel values of the portion of the 1-bit file that is to be displayed in the window, and displaying 140 the portion of the 1-bit file in the window as an 8-bit image data file by displaying each "on" pixel value of the portion as an 8-bit pixel with a value of 255 and each "off" pixel value of the portion as an 8-bit pixel with a value of 0. Of course, if the portion of the 1-bit image is to be displayed in inverted form, the step of displaying 140 the portion of the 1-bit file in the window comprises displaying each "on" pixel value of the portion as an 8-bit pixel with a value of 0 and each "off" pixel of the portion as an 8-bit pixel with a value of 255.

The second operation 200 comprises the steps of displaying 210 a slide controller variable between 0.5 and 1.0 and receiving 220 a first value between 0.5 and 1.0 selected by a user by means of the slide controller, which first value is a radius, expressed in terms of a width of a notional square region of an output medium, of a circular region that would be marked by an output device when printing a single "on" pixel of the 1-bit file.

The third operation 300 comprises the steps of displaying 310 a slide controller variable between 0.0 and 1.0 and receiving 320 a second value between 0.0 and 1.0 selected by the user by means of the slide controller, which second value is a scaling factor, expressed as a reduction in density of the circular region that would be marked by the output device when printing a single "on" pixel of the 1-bit file having just printed an "off" pixel, as compared with printing a single "on" pixel having just printed an "on" pixel.

The third operation 300 further comprises the step of calculating 330, for each possible combination of pixel values of a pixel of the 1-bit file and the eight pixels adjoining that pixel, for each "on" pixel of that combination, an area of the notional square region of the output medium corresponding to that pixel which will be marked as a result of printing of that pixel, for each "on" pixel of that combination, applying 340 the scaling factor to each such area of the notional square region according to whether the pixels to either side of the "on" pixel are "on" or "off" pixels, summing 350 the scaled areas to obtain a total proportion of the notional square region which would be marked for that combination of pixel values, and storing 360 the combinations of pixel values and total proportions in a look-up table.

The fourth operation 400 comprises, for each pixel of the portion of the 1-bit file that is to be displayed in the window, determining 410 the pixel values of that pixel and the eight pixels adjoining that pixel, matching 420 the combination of pixel values to an entry in the look-up table, reading 430 the corresponding total proportion of the notional square region which would be marked from the look-up table and displaying 440 an 8-bit pixel in the window with a value equal to the nearest integer to 255 multiplied by the total proportion.

Figure 6:
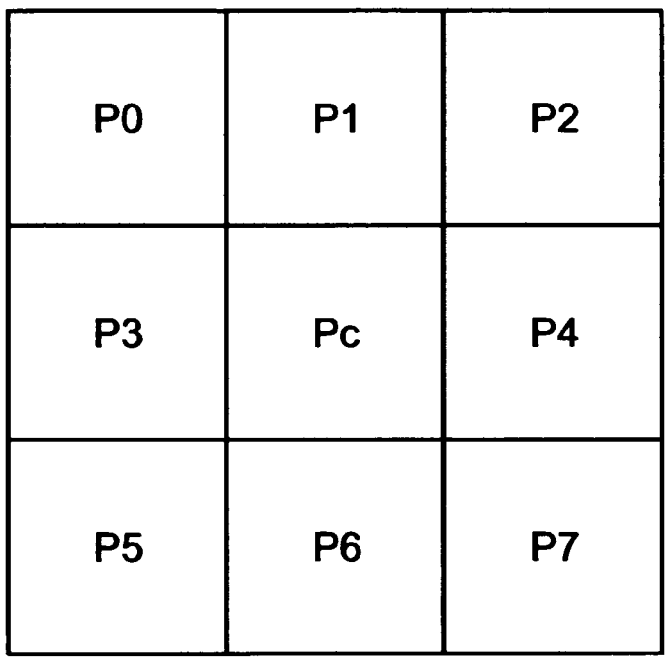
FIGS. 6 to 14 are schematic representations of regions of an output medium that form the basis of the calculations performed by the computer process of FIGS. 1 to 5 of actual regions of the output medium that would be marked by an output device.

The step 330 of the third operation 300 will now be described with reference to FIGS. 6 to 13. FIG. 6 shows nine notional square regions of the output medium corresponding to nine pixels of the 1-bit file. The notional square region corresponding to the pixel presently under consideration is denoted by Pc, with the eight regions adjoining the region corresponding to the pixel presently under consideration being denoted by P0 to P7.

For the purposes of determining the proportion of Pc that would be marked by the output device when printing the pixel of the 1-bit file that corresponds to Pc, there are three possible ranges of the radius of the circular region of the output medium that would be marked by the output device.

Figure 7:
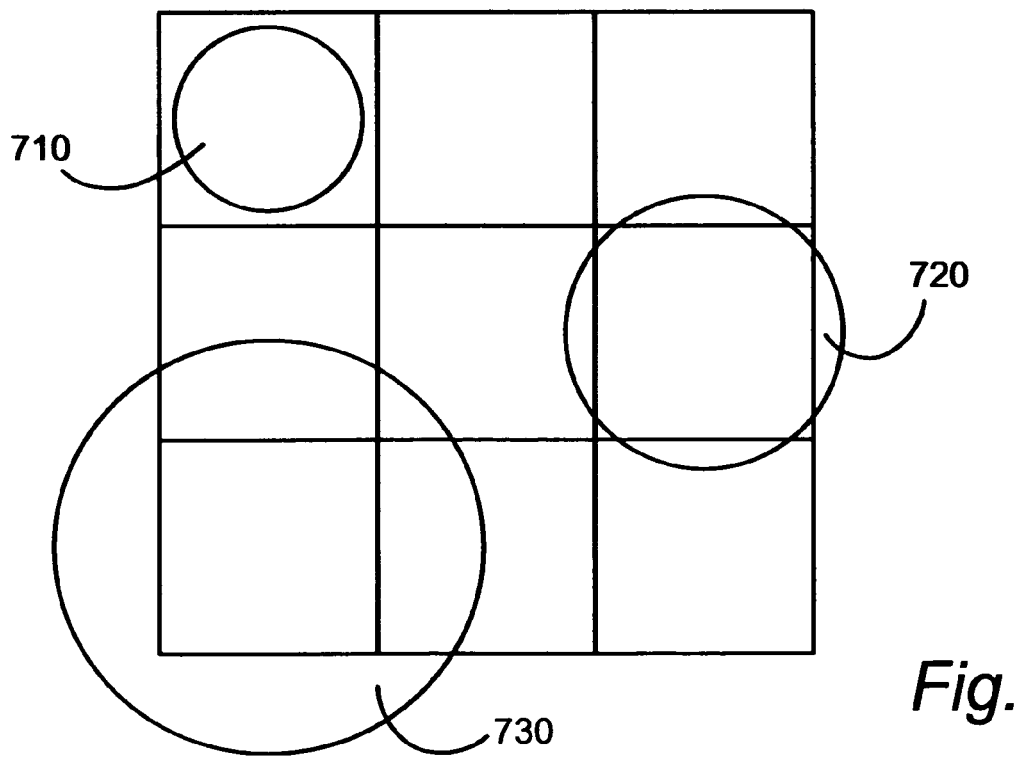

These are shown in FIG. 7 and are, taking one of the notional square regions of the output medium to be one unit in width:

$r \leq 0.5$, denoted by reference numeral 710;
$0.5 < r \leq 1/(\sqrt{2})$, denoted by reference numeral 720; and
$r > 1/(\sqrt{2})$, denoted by reference numeral 730.

For the range $r \leq 0.5$, if a circular region is marked by the output device on any of P0 to P7, it does not contribute to the proportion of Pc that is marked, because it does not extend beyond the edges of the notional square region on which it is marked. The values of the pixels to which P0 to P7 correspond are therefore irrelevant to the proportion of Pc that is marked by the output device. If the pixel to which Pc corresponds is "on", the proportion of Pc that is marked by the output device is therefore given by $\pi \cdot r^2$. If the pixel to which Pc corresponds is "off", the proportion of Pc that is marked is zero.

For the range $0.5 < r \leq 1/(\sqrt{2})$, if the pixel to which Pc corresponds is "on", the proportion of Pc that is marked is given by $\pi \cdot r^2$ minus the sum of the areas of the four segments of the circular region that extend beyond the edges of Pc. If a circular region is marked on any of P0 to P7, it can make no contribution to the proportion of Pc that is marked.

Figure 8:
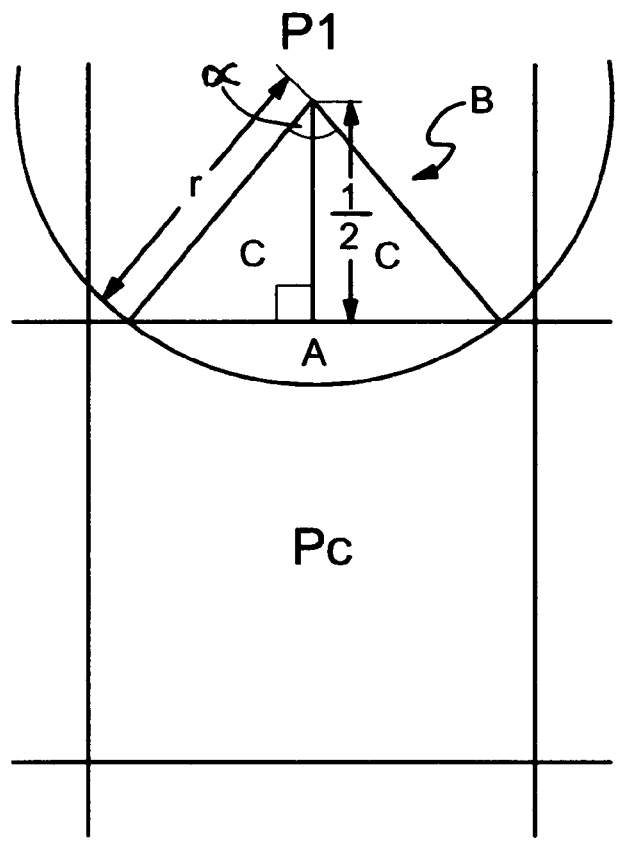

FIG. 8 shows Pc and part of P1 when the pixel to which Pc corresponds is "off" and a circular region is marked on P1. A segment A of the circular region marked on P1 extends across the edge of P1 into Pc. The segment A is the same as the segments of the circular region that extend beyond the edges of Pc.

The area of the segment A is derived from the area of the sector B of the circular region of which the segment A forms a part. The angle $\alpha$ included by the sector B is given by $$\cos(\alpha/2) = (1/2)/r$$

$$\alpha/2 = \cos^{-1}(1/2)/r$$

$$\alpha = 2 \cdot \cos^{-1}(1/2)/r$$

The area of sector B is $(\alpha/360°) \cdot \pi \cdot r^2$

The area of segment A is given by the area of sector B minus the area of triangle C.

The area of triangle C is $2 \cdot (1/2) \cdot (1/2) \cdot r \cdot \sin(\alpha/2)$.

The proportion of Pc that is marked if the pixel to which Pc corresponds is "on" is therefore $$\pi \cdot r^2 - 4 \cdot [(\alpha/360°) \cdot \pi \cdot r^2 - (1/2) \cdot r \cdot \sin(\alpha/2)]$$

If the pixel to which Pc corresponds is "off", a circular region marked on any of P1, P3, P4 or P6 will contribute to the proportion of Pc that is marked.

The proportion of Pc contributed by a circular region marked on P1 is therefore $$(\alpha/360°) \cdot \pi \cdot r^2 - (1/2) \cdot r \cdot \sin(\alpha/2)$$

For each combination of "on" and "off" values of the pixels to which P1, P3, P4 and P6 correspond, the proportion of Pc that is marked is given by the value of the above expression multiplied by the number of those four pixels that are "on".

For the range $r > 1/(\sqrt{2})$, if the pixel to which Pc corresponds is "on", the whole of Pc is marked and again, if a circular region is marked on any of P0 to P7, it can make no contribution to the proportion of Pc that is marked. If the pixel to which Pc corresponds is "on", the proportion of Pc that is marked is one.

Figure 9:
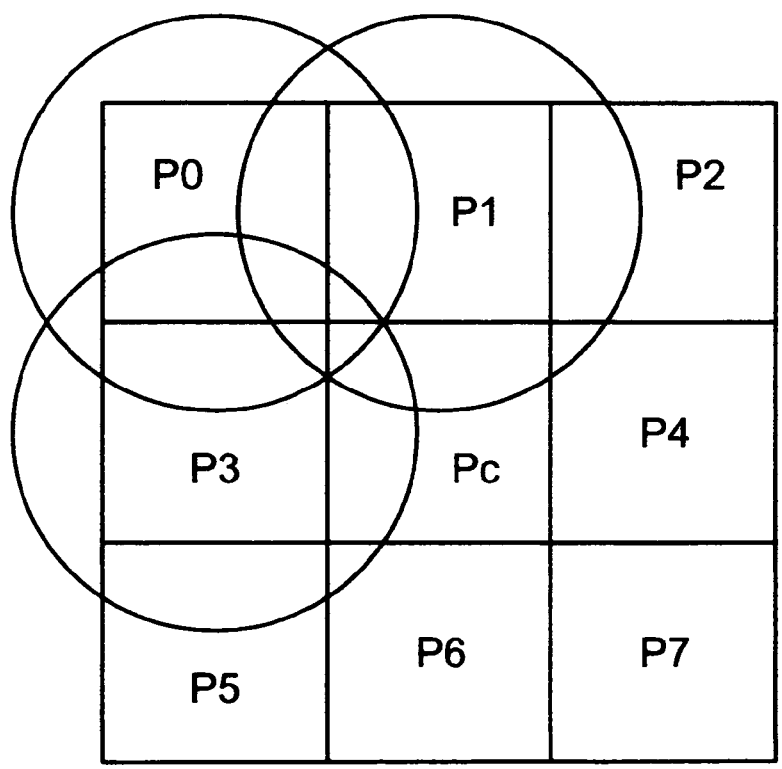
Figure 10:
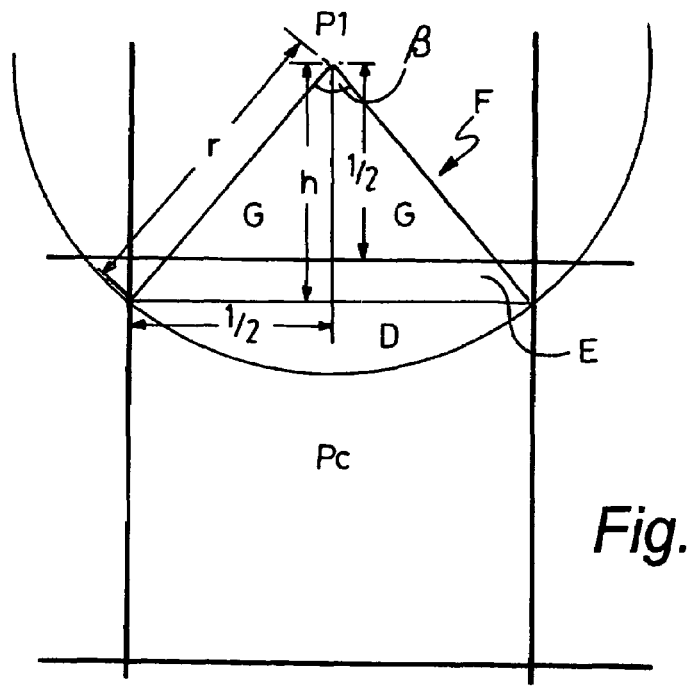

If the pixel to which Pc corresponds is "off", a circular region marked on any of P0 to P7 may contribute to the proportion of Pc that is marked. FIG. 9 shows circular regions marked on P0, P1 and P3. Dealing first with the contribution to the proportion of Pc that is made by the circular region marked on P1, FIG. 10 shows Pc and part of P1 when the pixel to which Pc corresponds is "off" and a circular region is marked on P1. A portion of the circular region marked on P1 extends across the edge of P1 into Pc, the portion consisting of the segment D of the circular region plus the rectangle E formed between the top edge of Pc and the chord defining the segment D.

The area of the segment D is derived from the area of the sector F of the circular region of which the segment D forms a part. The angle P included by the sector F is given by $$\sin(\beta/2)=(1/2)/r$$

$$(\beta/2)=\sin^{-1}(1/2)/r$$

$$\beta=2\cdot\sin^{-1}(1/2)/r$$

The area of sector F is $(\beta/360°)\cdot\pi\cdot r^2$

The area of segment D is given by the area of sector F minus the area of triangle G.

The area of triangle G is $2\cdot(1/2)\cdot(1/2)\cdot r\cdot\cos(\beta/2)$.

The area of segment D is therefore given by $$(\beta/360°)\cdot\pi\cdot r^2-(1/2)\cdot r\cdot\cos(\beta/2)$$

The area of the rectangle E is calculated using Pythagoras' Theorem, which gives that $$(1/2)^2+h^2=r^2, \text{ where h is the height of the triangle G}$$

$$h^2=r^2-(1/2)^2$$

$$h=\sqrt{(r^2-(1/2)^2)}$$

But since h=(1/2)+height of rectangle E, height of rectangle E=h−(1/2) and area of rectangle E is therefore $$\sqrt{(r^2-(1/2)^2)}-(1/2)$$

The contribution made to the proportion of Pc marked by a circular region marked on P1 is therefore $$(\beta/360°)\cdot\pi\cdot r^2-(1/2)\cdot r\cdot\cos(\beta/2)+\sqrt{(r^2-(1/2)^2)}-(1/2)$$

Figure 11:
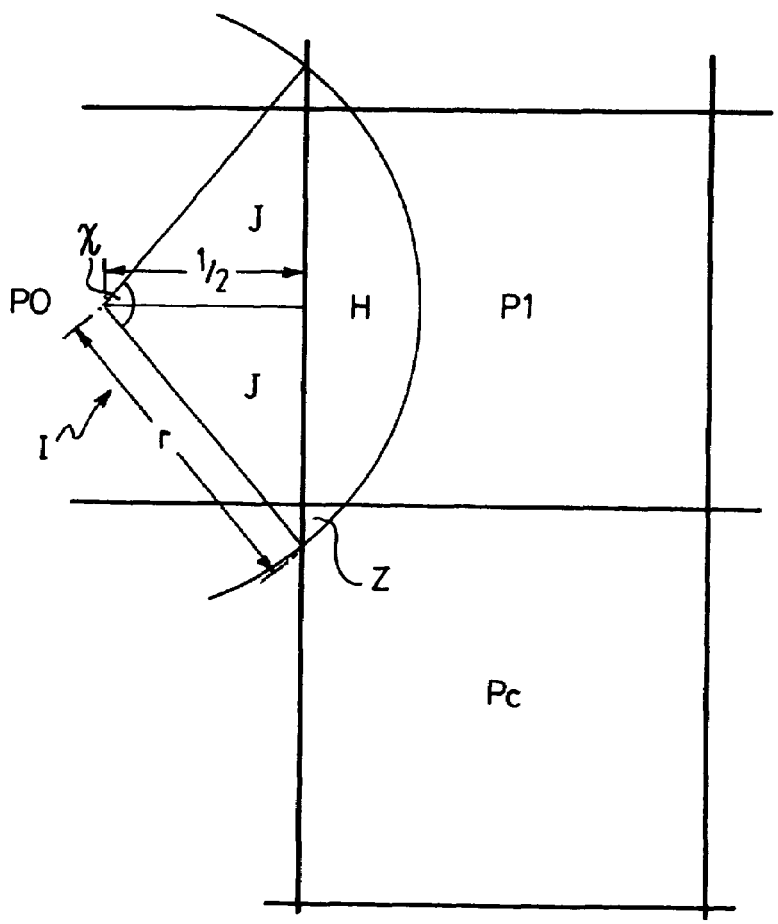

Dealing next with the contribution to the proportion of Pc that is marked by the circular region marked on P0, FIG. 11 shows Pc and part of P0 when the pixel to which Pc corresponds is "off" and a circular region is marked on P0. A portion Z of the circular region marked on P0 extends into Pc, the portion being equal in area to one half of the area of the segment H of the circular region minus the areas of the segment D and rectangle E shown in FIG. 10.

The area of the segment H is derived from the area of the sector I of the circular region of which the segment H forms a part. The angle χ included by the sector I is given by $$\cos(\chi/2)=(1/2)/r$$

$$(\chi/2)=\cos^{-1}(1/2)/r$$

$$\chi=2\cdot\cos^{-1}(1/2)/r$$

The area of sector I is $(\chi/360°)\cdot\pi\cdot r^2$

The area of segment H is given by the area of sector 1 minus the area of triangle J.

The area of triangle J is $2\cdot(1/2)\cdot(1/2)\cdot\sin(\chi/2)$.

The proportion Z of Pc contributed by a circular region marked on P0 is therefore $$(1/2)\cdot[(\chi/360°)\cdot\pi\cdot r^2-(1/2)\cdot\sin(\chi/2)-(\beta/360°)\cdot\pi\cdot r^2-(1/2)\cdot r\cdot\cos(\beta/2)+\sqrt{(r^2-(1/2)^2)}-(1/2)].$$

As can be seen from FIG. 9, if a circular region is marked on P0, it will contribute to the proportion of Pc that is marked only if a circular region is not marked on either P1 or P3. Moreover, if circular regions are marked on both P1 and P3, the contribution to the proportion of Pc that is marked is not simply twice the area of the segment D and the rectangle E shown in FIG. 10, because the circular regions marked on P1 and P3 will overlap.

Figure 12:
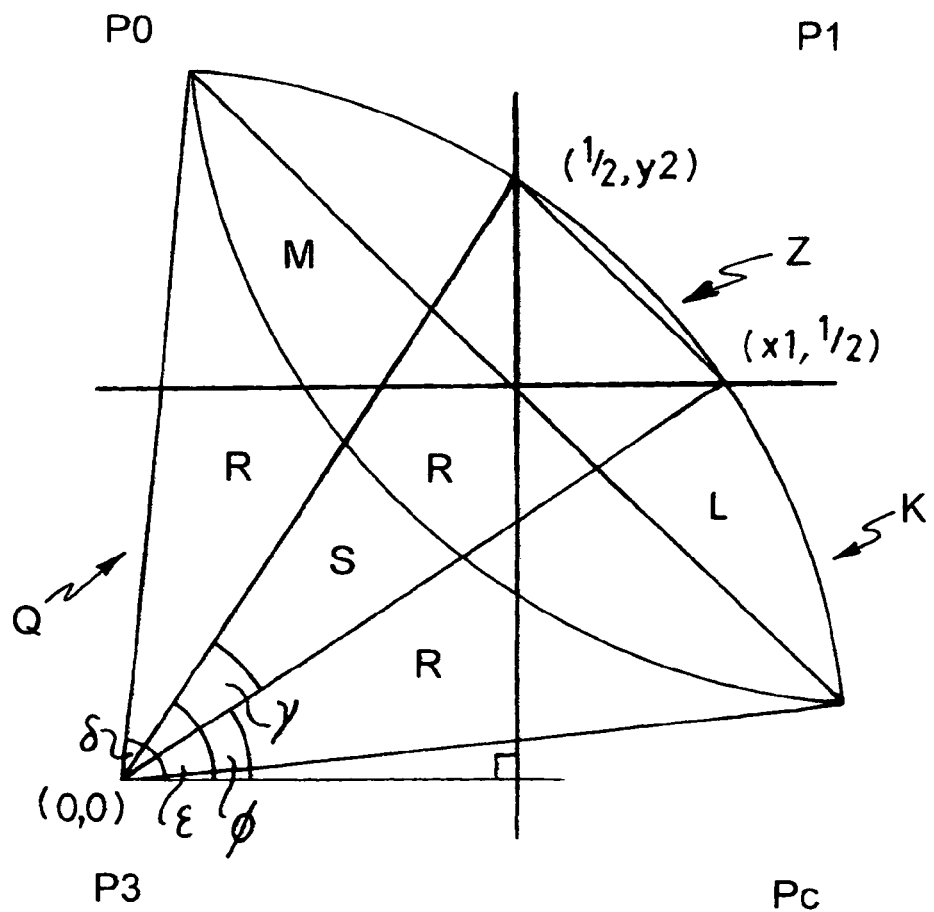

FIG. 12 shows the overlap K on Pc of the circular regions marked on P1 and P3. The area of the overlap K is given by one half of the sum of the areas of the segments L and M of the circular regions minus twice the area of the portion Z shown in FIG. 11 of the circular region marked on P3. That is K=(1/2)·(L+M−2·Z).

The area of the segment L is equal to the area of the segment M and is derived from the area of the sector Q of the circular region marked on P3 of which the segment L forms a part. The angle δ included by the sector Q is given by $$\cos(\delta/2)=(1/\sqrt{2})/r$$

$$\delta/2=\cos^{-1}(1/\sqrt{2})/r$$

$$\delta=2\cdot\cos^{-1}(1/\sqrt{2})/r$$

The area of sector Q is $(\delta/360°)\cdot\pi\cdot r^2$

The area of segment L is given by the area of sector Q minus the area of triangle R.

The area of triangle R is $2\cdot(1/2)\cdot(1/\sqrt{2})\cdot r\cdot\sin(\delta/2)$ The area of the segment L is therefore $(\delta/360°)\cdot\pi\cdot r^2-(1/\sqrt{2})\cdot r\cdot\sin(\delta/2)$.

The area of the overlap K is therefore given by $$(1/2)\cdot\{2\cdot[(\delta/360°)\cdot\pi\cdot r^2-(1/\sqrt{2})\cdot r\cdot\sin(\delta/2)]-$$
$$2\cdot(1/2)\cdot[(X/360°)\cdot\pi\cdot r^2-(1/2)\cdot\sin(X/2)-(\beta/360°)\cdot\pi\cdot r^2-$$
$$(1/2)\cdot r\cdot\cos(\beta/2)+\sqrt{(r^2-(1/2)^2)}-(1/2)]\}=$$
$$[(\delta/360°)\cdot\pi\cdot r^2-(1/\sqrt{2})\cdot r\cdot\sin(\delta/2)]-$$
$$[(X/360°)\cdot\pi\cdot r^2-(1/2)\cdot\sin(X/2)-(\beta/360°)\cdot\pi\cdot r^2-$$
$$(1/2)\cdot r\cdot\cos(\beta/2)+\sqrt{(r^2-(1/2)^2)}-(1/2)].$$

If circular regions are marked on P1 and P3, the contribution to the proportion of Pc that is marked is therefore given by $$2\cdot[(\beta/360°)\cdot\pi\cdot r^2-(1/2)\cdot r\cdot\cos(\beta/2)+\sqrt{(r^2-(1/2)^2)}-(1/2)]-$$
$$[(\delta/360°)\cdot\pi\cdot r^2-(1/\sqrt{2})\cdot r\cdot\sin(\delta/2)]-[(\chi/360°)\cdot\pi\cdot r^2-$$
$$(1/2)\cdot\sin(\chi/2)-(\beta/360°)\cdot\pi\cdot r^2-(1/2)\cdot r\cdot\cos(\beta/2)+\sqrt{(r^2-(1/2)^2)}-(1/2)].$$

Figure 13:
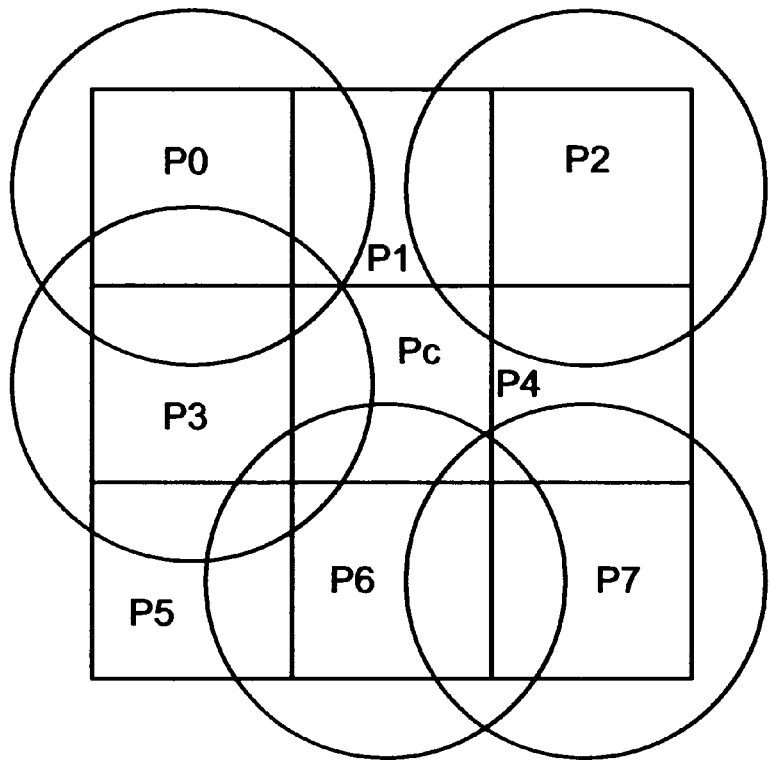

FIG. 13 shows the circular regions that would be marked by the output device for "on" values of the pixels to which P0, P2, P3, P6 and P7 correspond and "off" values of the pixels to which P1, Pc, P4 and P5 correspond. As can be seen from FIG. 13, for any combination of "on" and "off" values of the pixels to which P0 to P7 correspond, the contribution made to the proportion of Pc that is marked can be calculated using only the areas A, D, E, Z and/or K, as explained above.

The step 340 of the third operation 300 will now be described with reference to FIG. 14. If the computer process is to be used to model an output device such as an inkjet printer, in which the circular region marked by the device is unaffected by whether the device has marked a circular region immediately before marking that circular region or will mark a circular region immediately after marking that circular region, step 340 can be omitted, because the proportion of Pc that the computer process calculates will be marked by the output device marking the notional square regions adjoining Pc will in fact be marked by the output device.

Where the computer process is to be used to model an output device such as an imagesetter, in which the circular region marked by the device is affected by whether the device has marked a circular region immediately before marking that circular region or will mark a circular region immediately after marking that circular region, because of the turn on and turn off times of the laser used to mark the output medium, step 340 is necessary, because the proportion of Pc that the computer process calculates will be marked by the output device marking the notional square regions adjoining Pc will generally be greater than the proportion actually marked by the output device.

Figure 14:
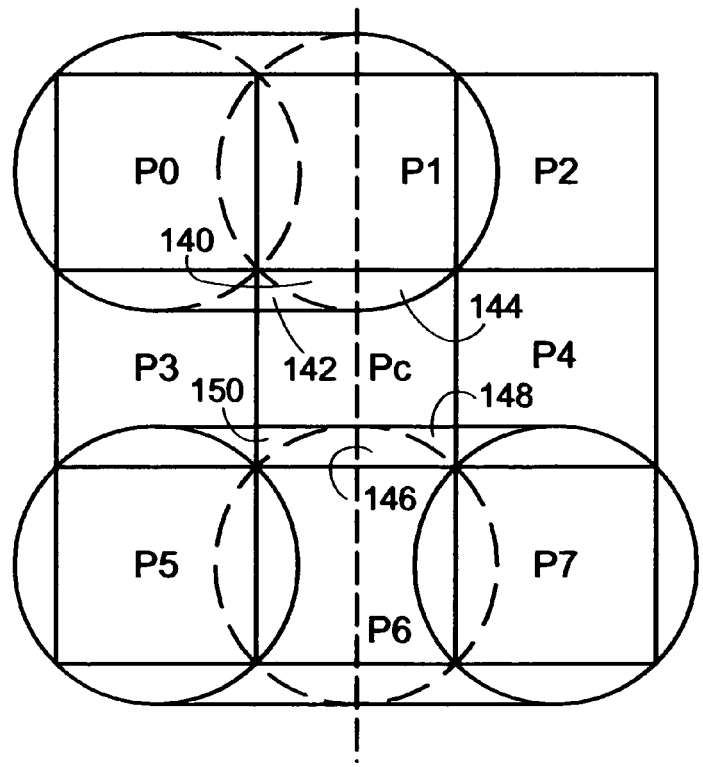

FIG. 14 shows the regions of the output medium that would be marked by an output device such as an imagesetter. The regions of the output medium are substantially circular but where two consecutive notional square regions are marked by the output device, as is the case with P0 and P1, because the laser of the output device is turned on when the laser is directed at P0, swept until it is directed at P1, then turned off, the region that is marked is elongate.

The proportion of Pc marked by the output device is calculated in two halves for each of the pixels to which P0 to P7 correspond. Taking P1 first, because the output device marks P0 before P1, the left hand half of the region marked on P1 contributes not only an area 140 that is half of the segment of the circular region to Pc, but also the approximately triangular area 142. The area of the left hand half of the resulting rectangular area contributed to Pc is given by $(1/2) \cdot (r-(1/2))$. The right hand half of the region marked on P1 contributes only an area 144 that is half of the segment of the circular region to Pc, because the output device does not mark P2 after P1. The area of the right hand half of the area contributed to Pc is simply half the area of the segment A, which was explained in relation to FIG. 8.

Taking P6 next, because the output device marks P5 before P6 and P7 after P6, both the left and right sides of the region marked on P6 contribute half of the segment 146 of the circular region to Pc as well as the approximately triangular areas 148 and 150. The area of each half of the resulting rectangular area contributed to Pc is given by $(1/2) \cdot (r-(1/2))$, as for the left hand half of P1.

The scaling of the calculated areas is as follows. The second value entered by the user is the amount by which the calculated area contributed to Pc by a half of a circular region marked on a notional square region adjoining Pc is reduced if the output device has not marked the notional square region immediately preceding or following that half of the circular region. In the case mentioned above of an inkjet printer, the second value entered by the user would be 0. In the case of an imagesetter, the second value entered by the user would be between 0 and 1.

Assuming that the user had entered a second value of 0.4, the total contribution of the regions marked on P1 and P6 to the proportion of Pc that is marked would be $$(1/2) \cdot (r-(1/2))+(1-0.4) \cdot (A/2)+(1/2) \cdot (r-(1/2))+(1/2) \cdot (r-(1/2)),$$

the scaling factor (1−0.4) being used in the second term, which corresponds to the right hand half of the region marked on P1, because the output device does not mark P2.

In order to determine the first and second values required by the computer process for a particular output device, the user would use a 1-bit file including a calibrated calibration strip. The calibration strip is calibrated in the sense that an uncalibrated calibration strip has previously been printed using the output device, the uncalibrated calibration strip including patches with requested image densities of 0%, 10%, 20%, . . . , 100%, the actual image densities of the patches being measured to produce a calibration curve of requested image density against actual image density, and the 1-bit file being generated using the calibration curve to ensure that a requested image density results in a corresponding actual image density when the 1-bit file is printed.

The user would select a patch of known image density, preferably 50% image density of the 1-bit file for display in the window on the display screen. The program includes a known density measurement tool operable to calculate an image density of a portion of an image displayed on the display screen. The user would use the density measurement tool to measure the image density of the 50% patch of the multiple-bit image generated by the program and would adjust the first value using the slide controller until the density measurement tool indicated that the measured image density of the 50% patch was 50%.

The user would then use the output device to print the calibrated calibration strip on the output medium. The calibration strip includes several concentric circles with a line thickness of one pixel. At the sides of the circles, where the lines of the circles are vertical lines of one pixel thickness, any dot loss is manifested as an absence of the sides of the circles, the severity of the dot loss being indicated by the lengths of the absent portions of the sides of the circles. The user would adjust the second value using the other slide controller until the multiple-bit image displayed on the display screen matched the calibration strip printed by the output device. Adjustment of the second value would cause the image density measurement of the density measurement tool to change, necessitating iterative adjustment of the first and second values. It would be possible to tie the first value to the second value such that once the first value had been set, the program would alter the first value in response to changes of the second value so as to keep the image density measurement of the image density measurement tool constant.

It will be appreciated that the foregoing description relates to only one embodiment of the invention and that the invention encompasses other embodiments as defined by the claims. In particular it will be apparent to a person skilled in the art that the program and method could be modified for use with output devices that mark regions that have shapes that are not circular, for example elliptical regions, whilst remaining within the scope of the claims.

The invention claimed is:

1. A computer program stored in a computer readable medium for executing on a computer system a computer process for generating a multiple-bit image data file from a 1-bit image data file, which multiple-bit file, when displayed on a display screen of the computer system, resembles an image that would appear on an output medium as a result of printing of the 1-bit file by an output device, the computer process comprising:

receiving a 1-bit image data file comprising an array of "on" and "off" pixels, each pixel corresponding to a notional rectangular region of an output medium, which notional rectangular region an output device would attempt to mark when printing the 1-bit file if the pixel were an "on" pixel;

receiving at least one first value that characterises a size and a shape of an actual region of the output medium that would be marked by the output device when printing a single "on" pixel of the 1-bit file;

receiving at least one second value that characterises a size and a shape of an actual region of the output medium that would be marked by the output device when printing two or more consecutive "on" pixels of the 1-bit file; and for each pixel in turn of the 1-bit file:

determining which of that pixel and the pixels neighbouring that pixel are "on" pixels;

calculating from the pixels determined to be "on" pixels and the first and second values, a proportion of the notional rectangular region of the output medium to which that pixel corresponds that would be marked by the output device when printing the pixels determined to be "on" pixels; and setting a value of a pixel of a multiple-bit image data file corresponding to that pixel according to the calculated proportion of the notional rectangular region of the output medium.

2. A program according to claim 1, wherein receiving the at least one first value comprises receiving a major and a minor diameter of an elliptical actual region of the output medium that would be marked by the output device when printing a single "on" pixel of the 1-bit file.

3. A program according to claim 1, wherein receiving the at least one first value comprises receiving a radius of a circular actual region of the output medium that would be marked by the output device when printing a single "on" pixel of the 1-bit file.

4. A program according to claim 3, wherein receiving the at least one first value comprises receiving a radius from one half to one times a width of the notional rectangular region of the output medium that would be marked by the output device.

5. A program according to claim 3, wherein receiving the at least one first value comprises receiving a radius from one half to one and a half times a width of the notional rectangular region of the output medium that would be marked by the output device.

6. A program according to claim 1, wherein receiving the at least one second value comprises receiving an indication of whether the output device would mark the actual region of the output medium continuously or discretely when printing two consecutive "on" pixels.

7. A program according to claim 1, wherein receiving the at least one second value comprises receiving that proportion of the actual region of the output medium that would be marked by the output device when printing an "on" pixel having just printed an "on" pixel, which would be marked by the output device when printing an "on" pixel having just printed an "off" pixel.

8. A program according to claim 7, wherein receiving the at least one second value comprises receiving that proportion from zero to one of the actual region that would be marked by the output device when printing an "on" pixel after an "on" pixel, which would be marked by the output device when printing an "on" pixel after an "off" pixel.

9. A program according to claim 1, wherein determining which of that pixel and the pixels neighbouring that pixel are "on" pixels comprises determining which of that pixel and the pixels adjoining that pixel are "on" pixels.

10. A program according to claim 1, wherein calculating from the pixels determined to be "on" pixels and the first and second values the proportion of the notional rectangular region that would be marked by the output device when printing the pixels determined to be "on" pixels comprises:

if that pixel is an "on" pixel, calculating from the at least one first value a first proportion of the notional rectangular region that would be marked by the output device when printing that pixel; and if the pixel to the left of that pixel and/or the pixel to the right of that pixel is an "off" pixel, calculating from the at least one second value a first scaling factor to be applied to the first proportion and applying the first scaling factor to the first proportion; and for each of the pixels adjoining that pixel that is an "on" pixel, calculating from the at least one first value a further proportion of the notional rectangular region that would be marked by the output device when attempting to print the pixel; and if the pixel to the left of the pixel neighbouring that pixel and/or the pixel to the right of the pixel neighbouring that pixel is an "off" pixel, calculating from the at least one second value a further scaling factor to be applied to the further proportion and applying the scaling factor to the further proportion; and summing the first and further scaled proportions.

11. A program according to claim 1, wherein the computer process further comprises:

calculating from the at least one first and second values a proportion of a notional rectangular region that would be marked by the output device when printing each possible combination of "on" and "off" pixels of that pixel and the pixels that adjoin that pixel; and constructing a lookup table containing the proportions of the notional rectangular region that would be marked and the possible combinations of "on" and "off" pixels of that pixel and the pixels adjoining that pixel.

12. A program according to claim 11, wherein calculating from the pixels determined to be "on" pixels and the first and second values the proportions of the notional rectangular region that would be marked by the output device when printing the pixels determined to be "on" pixels comprises identifying the combination of "on" and "off" pixels of that pixel and the pixels adjoining that pixel and reading from the lookup table the proportion of the notional rectangular region corresponding to that combination.

13. A program according to claim 1, wherein setting the value of the pixel of the multiple-bit image data file corresponding to that pixel according to the calculated proportion of the notional rectangular region comprises setting the value of a pixel of an 8-bit image data file corresponding to that pixel to a value equal to the nearest integer to 255 multiplied by the calculated proportion.

14. A method for generating a multiple-bit image data file from a 1-bit image data file, which multiple-bit file, when displayed on a display screen of a computer system, resembles an image that would appear on an output medium as a result of printing of the 1-bit file by an output device, the method comprising:

loading a 1-bit image data file into a computer system, the 1-bit image data file comprising an array of "on" and "off" pixels, each pixel corresponding to a notional rectangular region of an output medium, which notional rectangular region an output device would attempt to mark when printing the 1-bit file if the pixel were an "on" pixel;

entering at least one first value that characterises a size and a shape of an actual region of the output medium that would be marked by the output device when printing a single "on" pixel of the 1-bit file;

entering at least one second value that characterises a size and a shape of an actual region of the output medium that would be marked by the output device when printing two or more consecutive "on" pixels of the 1-bit file; and for each pixel in turn of the 1-bit file, using the computer system to:

determine which of that pixel and the pixels surrounding that pixel are "on" pixels;

calculate from the pixels determined to be "on" pixels and the first and second values, a proportion of the notional rectangular region of the output medium to which that pixel corresponds that would be marked by the output device when printing the pixels determined to be "on" pixels;

set a value of a pixel of a multiple-bit image data file corresponding to that pixel according to the calculated proportion of the notional rectangular region of the output medium; and display the multiple-bit image data file on a display screen.

15. A method according to claim 14, further comprising:

receiving a 1-bit image data file of a calibrated calibration strip, the calibrated calibration strip including a portion, which, if the 1-bit file were printed on the output medium by the output device would have a predetermined image density;

using the computer system to calculate an image density of the portion of the calibrated calibration strip displayed on the display screen;

entering a modified first value according to the image density calculated by the computer system; and repeating the method until the image density calculated by the computer system is equal to the predetermined image density.

16. A method according to claim 15, further comprising:

receiving a 1-bit image data file of a calibrated calibration strip, the calibrated calibration strip including a portion, which, if the 1-bit file were printed on the output medium by the output device, would demonstrate that proportion of the actual region of the output medium that would be marked by the output device when printing an "on" pixel having just printed an "on" pixel, which would be marked by the output device when printing an "on" pixel having just printed an "off" pixel;

causing the output device to print the 1-bit file on the output medium;

entering a modified second value according to a difference between an image that appears on the output medium and the multiple-bit image displayed on the display screen; and repeating the method until the multiple-bit image displayed on the display screen resembles the image that appears on the output medium.

17. A method according to claim 15, wherein the portion of the calibrated calibration strip includes a plurality of concentric circles with a line thickness of one pixel, and entering the modified second value according to the difference between the image that appears on the output medium and the multiple-bit image displayed on the display screen and repeating the method until the multiple-bit image displayed on the display screen resembles the image that appears on the output medium comprises measuring from the image that appears on the output medium a point at which the concentric circles become invisible and entering a modified second value until the concentric circles of the multiple-bit image displayed on the display screen become invisible at the same point as in the image that appears on the output medium.

18. A method according to claim 14, further comprising entering a modified first value after entering a modified second value, so as to maintain the image density calculated by the computer system equal to the predetermined image density.

* * * * *